(12) United States Patent
Mahapatra et al.

(10) Patent No.: US 12,483,401 B2
(45) Date of Patent: Nov. 25, 2025

(54) KEY PROTECTION FRAMEWORK

(71) Applicant: SAP SE, Walldorf (DE)

(72) Inventors: Ramachandra Mahapatra, Bhanjanagar (IN); Venkata Ramana Murthy K, Bangalore (IN)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 18/375,259

(22) Filed: Sep. 29, 2023

(65) Prior Publication Data
US 2025/0112769 A1 Apr. 3, 2025

(51) Int. Cl.
*H04L 9/08* (2006.01)

(52) U.S. Cl.
CPC .......... *H04L 9/0894* (2013.01); *H04L 9/0891* (2013.01)

(58) Field of Classification Search
CPC ..... H04L 9/0822; H04L 9/083; H04L 9/0891; H04L 9/0894
See application file for complete search history.

(56) References Cited

U.S. PATENT DOCUMENTS

| | | | |
|---|---|---|---|
| 2019/0318102 A1* | 10/2019 | Araya | H04L 9/0897 |
| 2021/0036851 A1 | 2/2021 | Villapakkam et al. | |
| 2021/0152336 A1* | 5/2021 | Seaborn | H04L 9/0891 |
| 2021/0194678 A1* | 6/2021 | Schindewolf | G06F 16/25 |
| 2022/0329413 A1 | 10/2022 | Schindewolf et al. | |
| 2024/0012933 A1* | 1/2024 | Widmer | H04L 9/0822 |
| 2024/0048361 A1* | 2/2024 | Berger | H04L 9/088 |

OTHER PUBLICATIONS

Extended European Search Report, dated Jan. 31, 2025, issued in corresponding European Patent Application No. 24193491.8. 11 pages.

* cited by examiner

*Primary Examiner* — Jeremy S Duffield
(74) *Attorney, Agent, or Firm* — Klarquist Sparkman, LLP

(57) ABSTRACT

A key protection framework for a platform includes a key protection engine for interfacing between an external key management system (KMS) and an external encryption service. A customer of the platform can select an existing external KMS and external encryption service to use with the framework. The key protection engine can onboard the external KMS with the platform by obtaining a configuration for the external KMS. Information extracted from the configuration can be used to establish a connection between the key protection engine and the external KMS, via which the key protection engine can interface with the external KMS to initiate rotation of a cryptographic key at the external KMS. Responsive to detection of a new version of a master key, the key protection engine can transmit a request to the external KMS to re-encrypt the cryptographic key with the new version of the master key.

20 Claims, 10 Drawing Sheets

KEY PROTECTION FRAMEWORK

FIELD

The field generally relates to a key protection framework for protecting cryptographic keys used to access encrypted data stored in a database of a platform.

BACKGROUND

Enterprises often utilize database management platforms hosted and administrated by service providers external to the enterprise. In this context, an important security principle involves sharing responsibilities such that no single user associated with the platform or customer has enough privileges to exploit the system and access the enterprise's sensitive data. Compliance with this principle helps to prevent fraud, theft, misuse of information, and other security compromises.

When a service provider deploys a database management platform for a relatively large enterprise, a database administrator associated with the platform may be assigned to manage a database layer of the platform, and a separate application administrator associated with the platform may be assigned to manage an application layer of the platform. However, for smaller enterprises (e.g., the mid-market segment), a common administrator may be assigned to manage both the database layer, which contains encrypted data, and the application layer of the platform, which contains a cryptographic key for decrypting the encrypted data. If this common administrator is compromised, a third party could gain access to the encrypted data as well as the corresponding cryptographic key, with catastrophic results for the security of the enterprise.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises onboarding an external key management system with a platform, the onboarding comprising obtaining a configuration from the external key management system comprising information regarding a master key stored by the external key management system, encrypting the configuration using an external encryption service, and storing the encrypted configuration in an internal database of the platform; responsive to a request to rotate a cryptographic key used to encrypt data stored by the platform, using information extracted from the configuration to establish a connection between a key protection engine executing on a server of the platform and the external key management system, and initiating rotation of the cryptographic key at the external key management system via the connection; and responsive to detecting a new version of the master key, transmitting a request to the external key management system to re-encrypt the cryptographic key with the new version of the master key.

In another embodiment, a computing system comprises at least one hardware processor; at least one memory coupled to the at least one hardware processor, the at least one memory comprising an internal database configured to store information objects for a customer of a platform; and one or more non-transitory computer-readable media having stored therein computer-executable instructions that, when executed by the computing system, cause the computing system to perform: obtaining a configuration for an external key management system, the configuration comprising information regarding a master key stored at the external key management system; encrypting the configuration at an external encryption service; storing the encrypted configuration in the internal database; responsive to a request to rotate a cryptographic key used to encrypt data stored by the platform, initiating rotation of the cryptographic key at the external key management system; and responsive to detecting a new version of the master key stored by the external key management system, transmitting a request to the external key management system to re-encrypt the cryptographic key with the new version of the master key.

In another embodiment, one or more nontransitory computer-readable media comprise computer-executable instructions that, when executed by a computing system, cause the computing system to perform operations for management of keys used to secure data for a customer of a platform; comprising: obtaining a configuration for an external key management system selected by the customer, the configuration comprising information identifying a master key stored at the external key management system; encrypting the configuration at an external encryption service; transmitting the configuration to an external encryption service for storage; storing the encrypted configuration in an internal database of the platform; responsive to a request to rotate a cryptographic key used to encrypt data stored by the platform, initiating rotation of the cryptographic key by the external key management system; executing a key rotation sensor thread configured to detect a new version of the master key; and responsive to detection of the new version of the master key by the key rotation sensor thread, transmitting a request to the external key management system to re-encrypt the cryptographic key with the new version of the master key.

As described herein, a variety of other features and advantages can be incorporated into the technologies as desired.

DETAILED DESCRIPTION

Example 1—Overview

Figure 1:
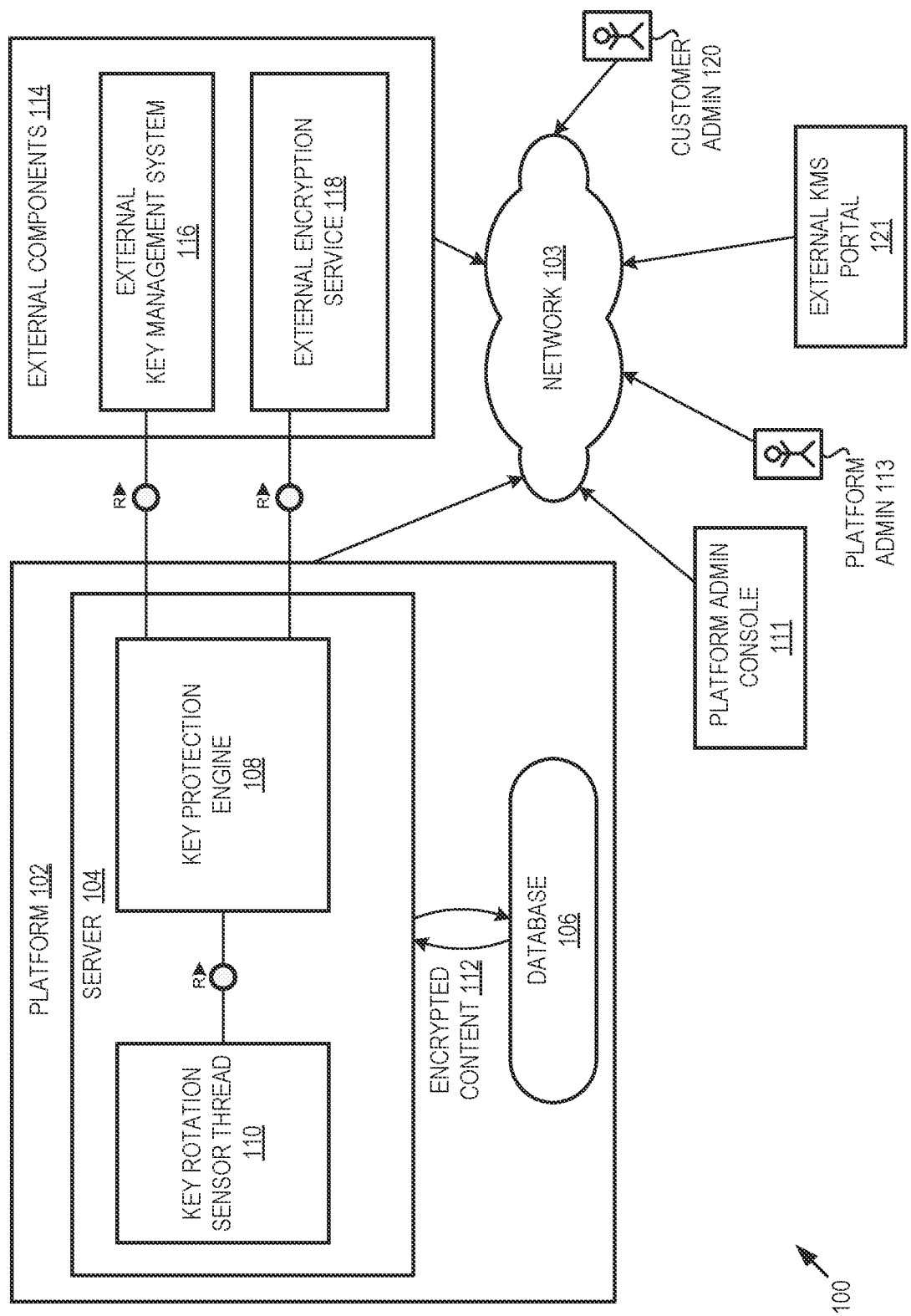
FIG. 1 is a block diagram of an example system implementing a key protection framework for a platform.

Database management platforms often use two different keys to protect the data stored therein. A master key, alternatively referred to as a Level 0 key or key encryption key, is used to encrypt and decrypt a cryptographic key, alternatively referred to as a Level 1 key or data encryption key. The cryptographic key, also referred to as a crypto key for the sake of brevity, is used to encrypt and decrypt data stored in internal databases of the database management platform.

Some database management platforms are configured for integration with an external key management system (KMS). Using an external KMS to manage keys used in the database management platform can improve security by preventing administrative users from accessing details of certain keys. For example, in one existing system, an administrative user associated with a customer of a database management platform can access a user interface of an external KMS to manage the master key and/or crypto key of the database management platform. However, this system lacks flexibility as to which external KMS is used, and does not allow the administrative user associated with the customer to configure the external KMS. Further, this system is tightly coupled with a specific encryption service: the Local Secure Store (LSS) utility. In particular, the system uses an LSS client to encrypt the crypto key, which is generated by an LSS server. However, as LSS only works on the LINUX® platform, this system is only applicable in certain limited contexts.

In contrast, a key protection framework for a platform is disclosed herein which includes a dedicated software module referred to as a key protection engine. The key protection engine can interface with an external KMS selected by the customer as well as an external encryption service selected by the customer. In particular, the customer (e.g., an administrative user associated with the customer) can select any existing external KMS to perform key management, and can provide the configuration for the selected external KMS to the platform.

In the key protection framework disclosed herein, the customer is not limited to using the LSS utility as in prior approaches; instead, the customer can select any existing encryption service to secure the data such as external KMS configuration. Accordingly, the disclosed techniques provide customers more control and flexibility with regard to key management and the manner in which their data is secured.

Further, the key protection framework disclosed herein also includes a key rotation sensor thread which is configured to sense key rotation in the selected external KMS. Upon detection of key rotation in the external KMS by the key rotation sensor thread, e.g., replacement of an existing master key with a new version of the master key, the platform can cause the crypto key to be re-encrypted with the new master key. Because the technologies described herein incorporate this functionality along with the above-described functionality of the key protection engine, the key protection framework (or elements thereof) can be extended as a separate microservice to support both on-premises and Cloud-based platforms. In contrast, prior solutions for external KMS integration are specifically tailored for on-premises database management platforms in which the LSS utility performs certain functions of the key protection engine and as well as detection of key changes that occur in the external KMS.

Example 2—Example System Implementing a Key Protection Framework

FIG. 1 is a block diagram of an example system 100 implementing a key protection framework. In the example, the system 100 includes a platform 102. Platform 102 can be an on-premises or cloud-based platform which involves storage of information objects, such the Business Objects Enterprise (BOE) or Enterprise Resource Planning (ERP) software available from SAP SE of Walldorf, Germany.

Platform 102 includes a server 104 and a database 106. Server 104 can be a Central Management Server (CMS) that contains configuration and operation information for platform 102. In the example, server 104 includes a key protection engine 108 and a key rotation sensor thread 110. Server 104, and the components thereof, are considered to be part of an application layer of platform 102. The application layer of platform 102 can also include other components which are not illustrated for the sake of brevity.

Key protection engine 108 is a module which can be used by the platform to perform various operations associated with securing the external KMS configuration. Key protection engine 108 can be configured to interface (e.g., connect) with an external KMS and an external encryption service. In some examples, key protection engine 108 uses a mechanism such as a C++ Client URL (curl) mechanism to connect to Representational State Transfer (REST) endpoints of an existing external KMS to retrieve the crypto key used for encryption and decryption of data stored in database 106.

Key rotation sensor thread 110 operates in conjunction with key protection engine 108 to detect any modification of the master key in the external KMS (e.g., customer-initiated rotation of the master key). In some examples, key rotation sensor thread 110 includes a constant pinging mechanism configured to sense version changes to the master key; such version changes can be considered "rotation" of the master key. As discussed further below, when key rotation sensor thread 110 senses rotation of the master key, key protection engine 108 can proceed to re-encrypt the crypto key with the new master key.

Server 104 sends encrypted content 112 to, and receives encrypted content 112 from, database 106. Database 106 can be configured to store encrypted content 112 associated with the customer. Encrypted content 112 can include encrypted information objects which depict information in a structured form. Herein, database 106 is occasionally described as an "internal database" to distinguish it from components external to, and not within the purview of, the platform. In one example, database 106 is a CMS database which is maintained by server 104. Database 106 can alternatively be referred to as a system repository for platform 102. Database 106 is considered to be part of a database layer of platform 102, which can also include other components which are not illustrated for the sake of brevity.

Platform 102, and the components thereof, can be networked via wired or wireless network connections, including the Internet. In the depicted example, network 103 represents such connections. Alternatively, systems can be connected through an intranet connection (e.g., in a corporate environment, government environment, or the like).

The components of platform 102, and certain data stored therein, can be accessed by a platform admin 113. Platform admin 113 is an administrative user or "admin" who has been granted access to certain aspects of platform 102. In some examples, platform admin 113 is an employee or sub-contractor of platform 102. While a single platform admin 113 is depicted, in some examples platform 102 is accessed and administered by multiple platform admins. In the example, platform admin 113 accesses the components via a platform admin console 111. Platform admin console 111 can include a user interface (UI) via which administrative users, such as platform admin 113, can access certain aspects of platform 102. Platform admin console 111 can include software that enables authorized users to perform administrative tasks associated with platform 102.

System 100 further includes external components 114 connected to network 103. The descriptor "external" is used to indicate that external components 114 are external to, and not part of, platform 102. As such, platform-side administrative users, such as platform admin 113, do not have access to the external components 114 or the data stored therein. In the example, external components 114 include an external KMS 116 and an external encryption service 118. External KMS 116 can be a service provided by a vendor selected by the customer. As used herein, the term "customer" refers to an entity (e.g., an enterprise) that subscribes to the platform;

A customer-side administrative user, referred to as customer admin 120, can access the components of external KMS 116 using an external KMS portal 121. External KMS portal 121 can be a web-based tool that allows customer-side users to perform administrative tasks associated with the respective vendor of the external KMS 116. Customer admin 120 can also have access to platform admin console 111 in some circumstances. For example, as described herein, customer admin 120 can use platform admin console 111 to input the external KMS configuration to platform 102 during the onboarding process for the external KMS.

Customer admin 120 can be a person granted access to certain aspects of external components 114 by the customer. In some examples, customer admin 120 is an employee or sub-contractor of the customer. While a single customer admin 120 is depicted, in some examples external components 114 are accessed and administered by multiple customer admins.

External KMS 116 can be an existing external KMS selected by the customer (e.g., by customer admin 120). Some examples of existing external KMSs include SAP Data Custodian available from SAP SE of Walldorf, Germany, Oracle Key Vault available from Oracle Corporation of Austin, Texas, Azure Key Vault available from Microsoft Corporation of Redmond, Washington, and Amazon Web Services (AWS) Key Management Service available from Amazon.com, Inc. of Seattle, Washington. External KMS 116 can be configured to generate, rotate, and delete the master key. For example, customer admin 120 can use external KMS portal 121 to effect desired changes to the master key. In contrast, platform admin 113 cannot modify the master key via the external KMS.

External encryption service 118 can be any service that delegates the protection of sensitive data, such as keys, to mechanisms provided by an operating system accessed by customer admin 120. In the example, the external KMS configuration information, including information about the master key but not the master key itself, can be encrypted by external encryption service 118. Example implementations of external encryption service 118 include the Data Protection Application Programming Interface (DPAPI) for WINDOWS® platforms, LSS for LINUX® platforms, and encryption services that encrypt data using Local Protected Storage (LPS) or Trusted Platform Module (TPM) technology.

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, platform 102 can include additional components such as one or more additional servers, databases, UIs, and the like. Similarly, external components 114 can include additional components such as additional customer-side servers, databases, UIs, and the like. In some examples, additional platform-side and/or customer-side administrative users can have access to certain components of platform 102 and/or external components 114, e.g., via a UI of platform admin console 111 and/or external KMS portal 121.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the encrypted content stored in database 106, the external KMS configuration data stored in external encryption service 118, and the like can be stored in one or more computer-readable storage media or computer-readable storage devices. The technologies described herein can be generic to the specifics of operating systems or hardware and can be applied in any variety of environments to take advantage of the described features.

Example 3—Example Method for External KMS Onboarding

Figure 2:
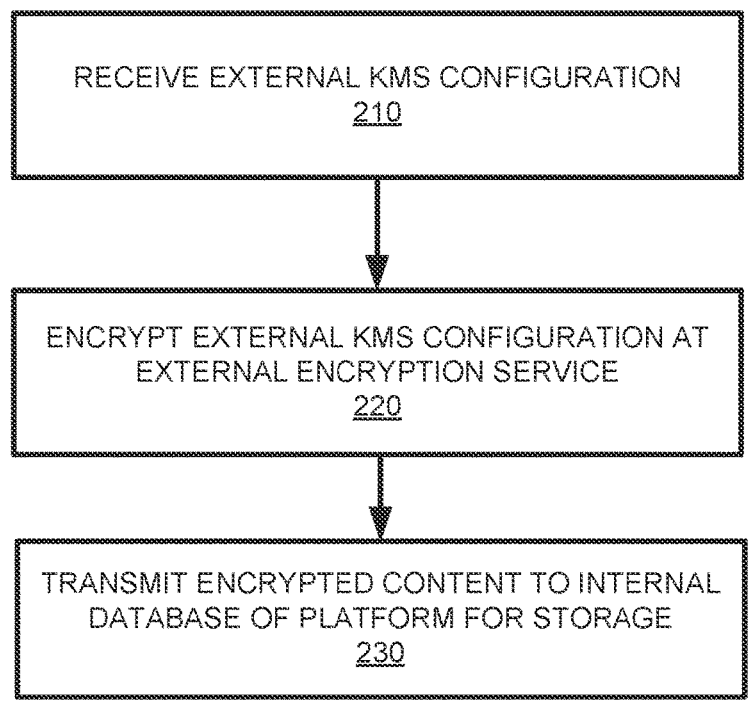
FIG. 2 is a flowchart of an example method for onboarding an external key management system with a platform.

FIG. 2 is a flowchart of an example method 200 for external KMS configuration and can be performed, for example, by the system of FIG. 1. For example, a customer can select an external KMS and an external encryption service to facilitate key management for encryption and decryption of data stored by a platform, such as platform 102 of FIG. 1. The customer (e.g., a customer admin granted access to the external KMS by the customer) can then register (e.g., onboard) the external KMS with the platform by providing an external KMS configuration to the platform. A key protection engine of the platform can serve as an interface between the platform, the external KMS, and the external encryption, as described below.

In the example, at 210, an external KMS configuration is received. A customer admin can input the external KMS configuration to the platform via a platform admin console, such as platform admin console 111 of FIG. 1. For example, the customer admin can first register the customer as a tenant of the external KMS and initiate generation of a master key at the external KMS via an external KMS porta. The customer admin can then obtain details about the generated master key via the external KMS portal. Subsequently, the customer admin can provide the details about the master key, as well as details regarding the external KMS itself, to the platform in the form of the external KMS configuration.

The external KMS configuration can includes details regarding the master key as well as details regarding the external KMS itself. The details regarding the master key can include an identifier for the master key ("MasterkeyID"), a version number of the master key (e.g., version 0 for a newly created master key, and version 1 for a subsequent version of that master key), an Application Programming Interface (API) key (e.g., username) associated with the master key, and a secret (e.g., password) associated with the master key. The details regarding the external KMS can include one or more REST endpoints which can be used to connect with the external KMS and complete the transactions. However, the external KMS configuration does not include the master key itself (e.g., the value of the master key); rather, the master key itself remains within the external KMS and its value is never exposed to customer admin 120 or any other user.

At 220, the external KMS configuration is encrypted at an external encryption service (e.g., external encryption service 118 of FIG. 1). For example, the external KMS configuration which was input via the platform admin console be transmitted to a server of the platform. The server can format the external KMS configuration as a data object, such as a JavaScript Object Notation (JSON) data object, and then transmit the formatted external KMS configuration to the key protection engine. The key protection engine can then transmit the formatted external KMS configuration to the external encryption service for encryption. Upon receipt of the external KMS configuration, the external encryption service encrypts the external KMS configuration.

At 230, the encrypted content (e.g., the encrypted version of the external KMS configuration) is transmitted to an internal database of the platform (e.g., database 106 of FIG. 1) for storage. For example, the external encryption service can transmit the encrypted content to the key protection engine, which in turn transmits the encrypted content to the server. The server can then transmit the encrypted content to the internal database for storage.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, transmitting an external KMS configuration can be described as receiving an external KMS configuration depending on perspective.

Example 4—Example External KMS Configuration

As an example, Table 1 shows fields that can be included in an external KMS configuration. In some examples, the external KMS configuration is a data object in JSON format which includes at least the fields shown in Table 1. The fields include details regarding the master key (e.g., an API Key, a secret, and a master key identifier) as well as details regarding the external KMS itself, including REST endpoints which can be used to connect with the external KMS and complete the transactions.

TABLE 1

External KMS Configuration Fields

| Name | Description | Sample(s) of Data (Internal representation) |
|---|---|---|
| apiKey | Username associated with master key | bnUkwsBlPW70dtGcOjsdLzRQCvnIGD |
| secret | Password associated with master key | N8dHyAbxjwENmToVrEjvpTnC7e4ME |
| MasterkeyID | Identifier of master key (not master key itself) | 8go4921f-0d2i-2g5u-3921-17835928f17 |
| Masterversion | Version number of master key | 1 |
| Oauth | Endpoint to generate access token and refresh token | {{baseUrl}}/auth/request |
| refresh | Endpoint to generate access token from a valid refresh token | {{baseUrl}}/auth/refresh |
| generateDEK | Endpoint to generate crypto key | {{baseUrl}}/crypto/generateDataKey?includePlaintext=true |
| decryptDEK | Endpoint to decrypt an encrypted crypto key | {{baseUrl}}/crypto/decrypt |

In some examples, the key protection engine utilizes a C++ curl mechanism to connect with the REST endpoints specified in the external KMS configuration (e.g., Oauth, refresh, generateDEK, and decryptDEK). The curl mechanism is a command-line tool for sending and receiving data including files using URL syntax.

Example 5—Example Operations for External KMS Onboarding

Figure 3:
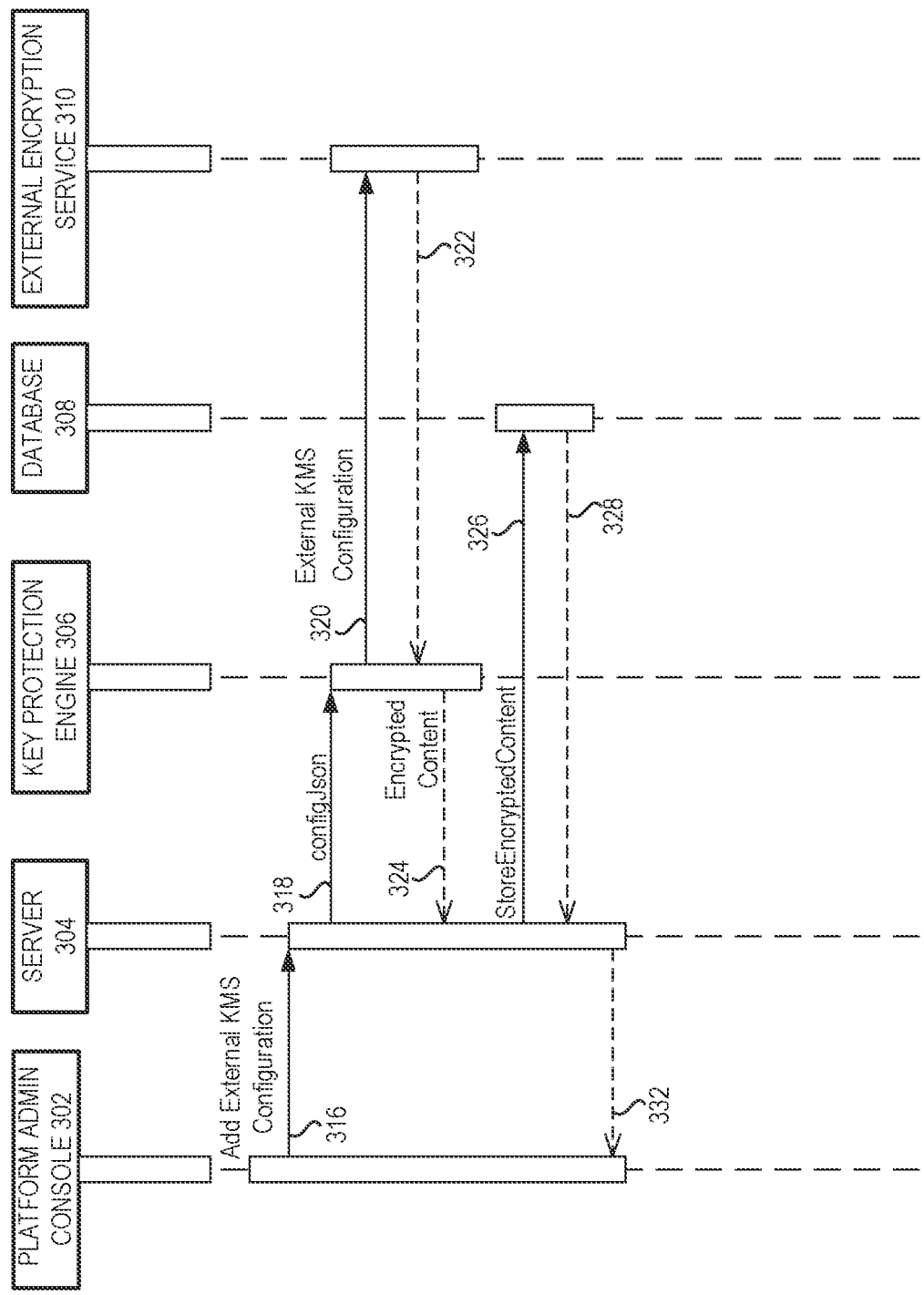
FIG. 3 is a timing diagram showing a process for onboarding an external key management system with a platform.

FIG. 3 is a diagram 300 illustrating operations involved in onboarding an external KMS. The operations can be carried out by a platform admin console 302, a server 304, a key protection engine 306, a database 308, and an external encryption service 310, which components can have functions analogous to those described for the correspondingly named components illustrated in FIG. 1. A customer admin, such as customer admin 120 of FIG. 1, can access platform admin console 302 via a UI to perform operations for configuring the external KMS, including operations for onboarding the external KMS with the platform. In particular examples, platform admin console 302 can be the Central Management Console (CMC) implemented in the BOE software application available from SAP SE of Walldorf, Germany.

At 316, platform admin console 302 sends a request to server 304 to add an external KMS configuration. The request can include details regarding a master key generated by and stored at the external KMS, as well as details regarding the external KMS itself.

The request is received by server 304. Server 304 then reformats the data included in the request and sends the result to key protection engine 306 at 318. In the example, the data is reformatted in a JSON format and includes fields such as those shown in Table 1 above. In other examples, other data object formats can be used.

Key protection engine 306 then forwards the external KMS configuration to external encryption service 310 at 320 to encrypt the content. After receiving the external KMS configuration, external encryption service 310 encrypts the external KMS configuration.

External encryption service 310 then sends the encrypted content to key protection engine 306 at 322, which in turn relays the encrypted content to server 304 at 324. Upon receipt of the encrypted content, server 304 responds by sending a "StoreEncryptedContent" command to database 308 at 326, along with the encrypted content, to instruct database 308 to store the encrypted content.

In response, database 308 stores the encrypted content and then sends an acknowledgement to server 304 at 328, indicating that the encrypted content has been stored. Server 304 then sends an acknowledgement to platform admin console 302 at 332, confirming that the external KMS configuration has been added.

Example 6—Example Method for Internal Key Rotation

Figure 4:
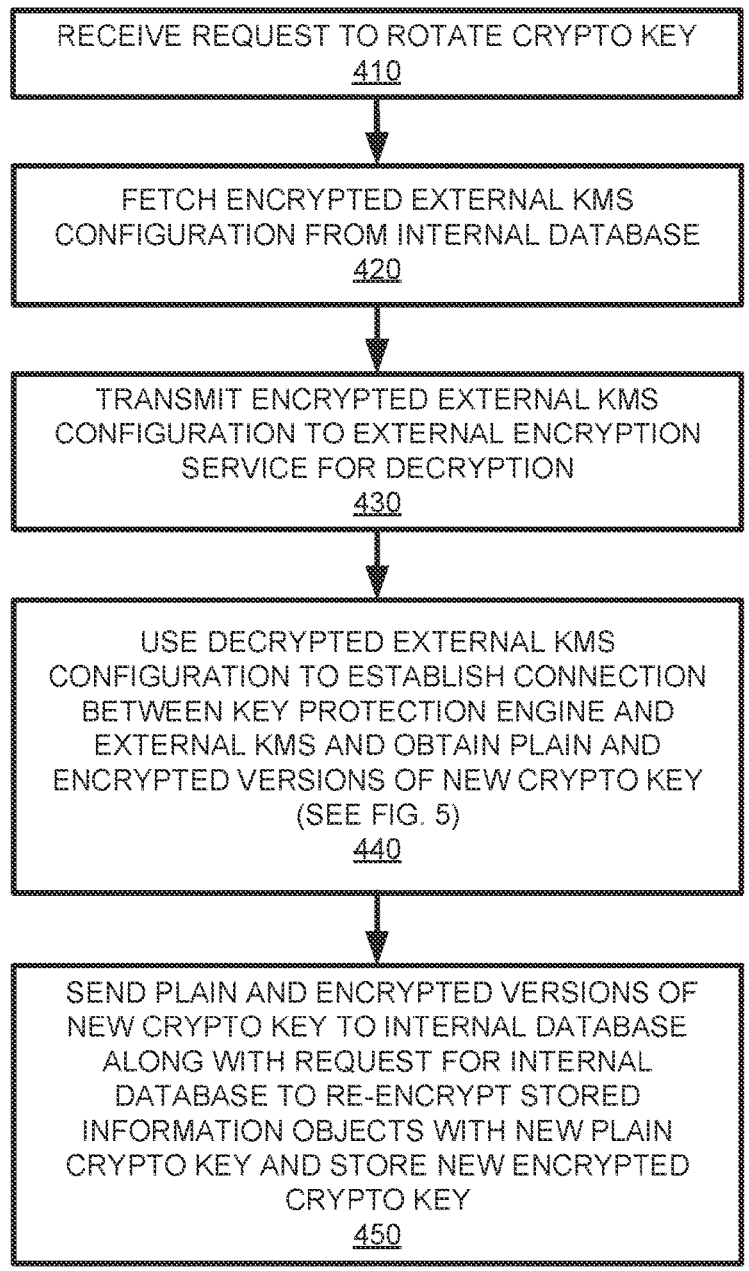
FIG. 4 is a flowchart of an example method for internal rotation of a cryptographic key used to encrypt and decrypt data stored in an internal database of a platform.

FIG. 4 is a flowchart of an example method 400 for internal key rotation and can be performed, for example, by the system of FIG. 1. Method 400 can be performed subsequent to method 200 (e.g., following registration/onboarding of the external KMS selected by the customer with the platform). As used herein, internal key rotation refers to rotation of the crypto key (e.g., generation of a new crypto key). In some examples, a platform-side admin tool, such as platform admin console 111 of FIG. 1, initiates internal key rotation at predetermined time intervals (e.g., intervals defined by a service-level agreement (SLA) between the platform and the customer).

In the example, at 410, a request to rotate the crypto key is received. As discussed further below, this can include a server of the platform receiving a request from a platform admin (e.g., via a platform admin console) to create a new crypto key.

At 420, the encrypted external KMS configuration is fetched from the platform's internal database. As discussed further below for FIG. 5, this can include the server sending a read request to the internal database for the encrypted external KMS configuration.

In the example, at 430, the encrypted external KMS configuration received from the internal database is transmitted to the external encryption service for decryption. For example, the server can transmit the encrypted content to the key protection engine, which in turn transmits the encrypted content to the external encryption service for decryption.

At 440, the decrypted external KMS configuration received from the external encryption service is used to establish a connection between the key protection engine and the external KMS and obtain plain and encrypted versions of a new crypto key. For example, as discussed further below with reference to FIG. 5, one or more REST endpoints specified in the external KMS configuration can be used by the key protection engine to establish a connection with the external KMS, obtain a new (encrypted) crypto key from the external KMS, and obtain a decrypted version of the new crypto key from the external KMS using details regarding the master key from the external KMS configuration.

At 450, the key protection engine sends the plain and encrypted versions of the new crypto key to the internal database of the platform (e.g., database 106 of FIG. 1) to be stored for further use, along with a request that the internal database re-encrypt the information objects stored therein using the new plain crypto key. The internal database is not instructed to store the new plain crypto key in persistent storage; rather, the new plain crypto key is not stored after it is used to re-encrypt the stored information objects.

Figure 5:
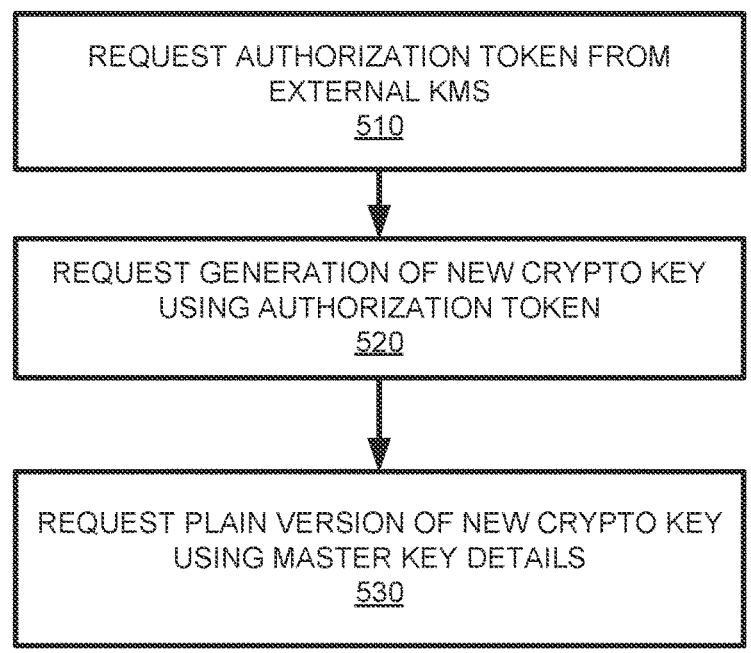
FIG. 5 is a flowchart of an example method for establishing a connection between a key protection engine of a platform and an external key management system.

Example 7—Example Operations for Establishing a Connection Between the Key Protection Engine and the External KMS FIG. 5 is a flowchart of an example method 500 for establishing a connection between the key protection engine and the external KMS and can be performed, for example, by the system of FIG. 1. Method 500 can be performed subsequent to method 200 (e.g., following registration/onboarding of the external KMS selected by the customer with the platform), and during method 400 (e.g., at step 440 of method 400). While the present example describes establishing a connection between the key protection and the external KMS to generate a new crypto key, a similar method can be performed whenever the key protection engine needs to establish a connection with the external KMS.

In the example, at 510, the key protection engine requests an authorization token from the external KMS. This can include the key protection engine utilizing a C++ curl mechanism to send a request to an Oauth REST endpoint specified in the external KMS configuration. The request can include credentials such as a username and password for access to the external KMS (e.g., the apiKey and secret parameters). Additionally or alternatively, the request can include information regarding the master key, such as values of the MasterkeyID and Masterversion parameters.

Once the connection has been established, the key protection engine sends a request to the external KMS to generate a new crypto key at 520. This can include the key protection engine utilizing the C++ curl mechanism to send a request to a generateDEK REST endpoint specified in the external KMS configuration. In response to the request, the external KMS generates the new crypto key and returns an encrypted version of the new crypto key to the key protection engine.

At 530, the key protection engine sends a request to the external KMS to decrypt the new crypto key using master key details from the external KMS configuration. This can include the key protection engine utilizing the C++ curl mechanism to send a request to a decryptDEK REST endpoint specified in the external KMS configuration. The request can include an ID and version of the master key (e.g., the MasterkeyID and Masterversion parameters), but not the master key itself which remains within the external KMS. In response to the request, the external KMS returns a decrypted ("plain") version of the new crypto key to the key protection engine. As discussed above with reference to FIG. 4, the key protection engine can then send the plain and encrypted versions of the new crypto key to an internal database of the platform, along with a request for the internal database to re-encrypt the information objects stored therein with the new crypto key and store the encrypted version of the new crypto key.

Example 8—Example Operations for Internal Key Rotation

Figure 6:
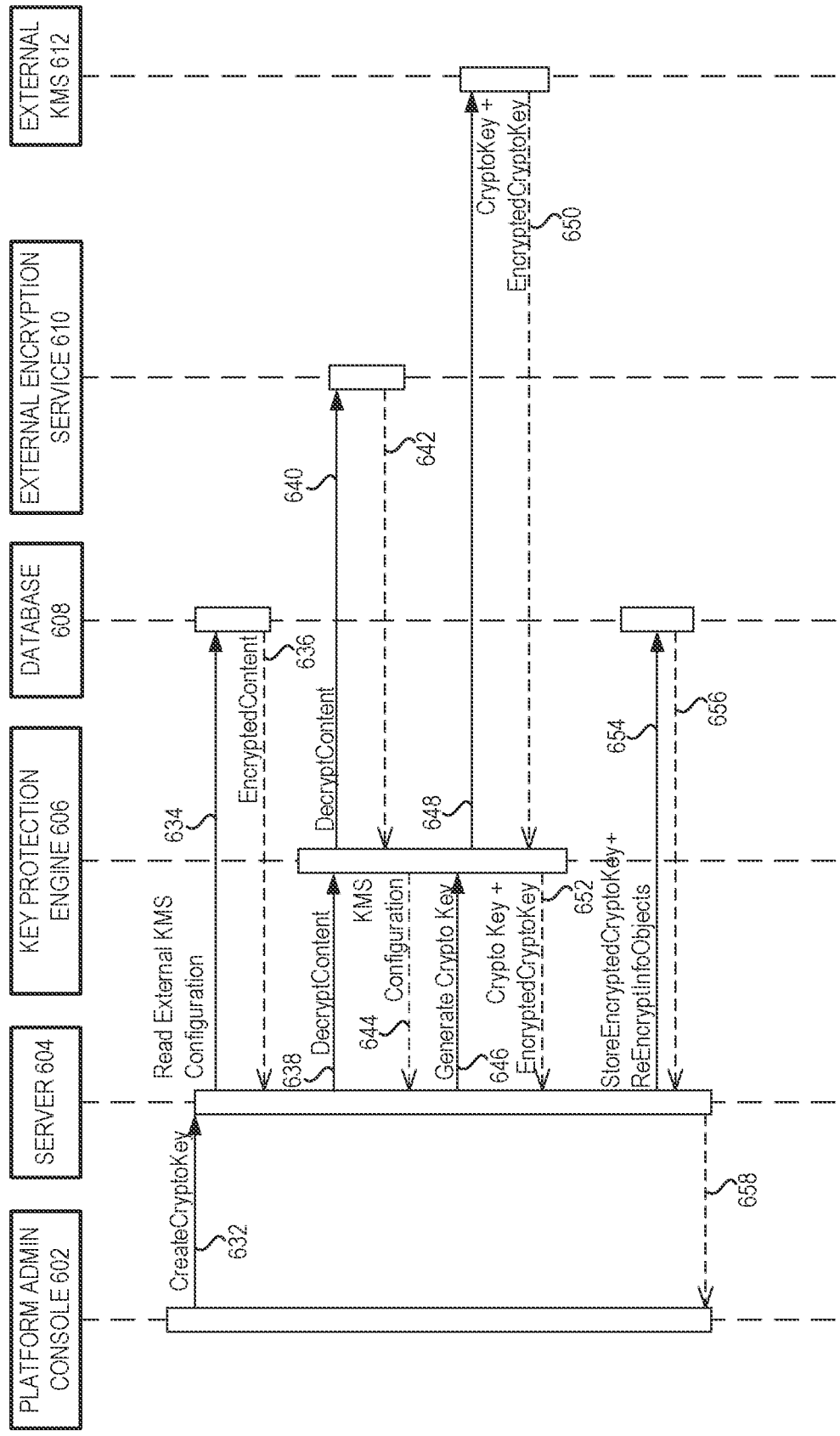
FIG. 6 is a timing diagram showing a process for internal rotation of a cryptographic key used to encrypt and decrypt data stored in an internal database of a platform.

FIG. 6 is a diagram 600 illustrating operations involved in internal key rotation. The operations can be carried out by a platform admin console 602, a server 604, a key protection engine 606, a database 608, an external encryption service 610, and an external KMS 612, which components can have functions analogous to those described for the correspondingly named components illustrated in FIGS. 1 and 3.

At 632, the platform admin console 602 sends a CreateCryptoKey request to server 604 to initiate internal key rotation. In some examples, the request is automatically sent by platform admin console 602 at predetermined intervals (e.g., once every two weeks) based on an SLA associated with the customer. In other examples, a customer admin provides input via a UI to platform admin console 602 which causes the request to be initiated.

Upon receipt of the request, server 604 sends a request 634 to database 608 to read the external KMS configuration. Upon receipt of the request, database 608 sends the encrypted external KMS configuration as encrypted content to server 604 at 636. Server 604 then sends a DecryptContent request to key protection engine 606 at 638 to decrypt the encrypted content (i.e., the encrypted external KMS configuration).

Key protection engine 606 forwards the DecryptContent request to external encryption service 610 at 640, the request including the encrypted external KMS configuration. In response, external encryption service 610 decrypts the external KMS configuration and sends the resulting decrypted external KMS configuration to key protection engine 606 at 642. Key protection engine 606 then forwards the decrypted external KMS configuration to server 604 at 644.

At 646, server 604 sends a request to key protection engine 606 to generate a new crypto key (e.g., to internally rotate the crypto key). Upon receipt of the request to generate the new crypto key, key protection engine 606 establishes a connection with external KMS 612, e.g., by sending an authorization request to a REST endpoint of external KMS 612 and supplying credentials extracted from the (decrypted) external KMS configuration to external KMS 612, as discussed above with reference to FIG. 5. After a connection between key protection engine 606 and external KMS 612 has been established, key protection engine 606 forwards the request to generate a new crypto key to external KMS 612 at 648. This can include key protection engine 606 sending a first request to a first REST endpoint of external KMS 612 to generate a new crypto key via the connection, and then sending a second request to a second REST endpoint of external KMS 612 to send a decrypted ("plain") version the new crypto key. As discussed herein, the second request can include master key details extracted from the external KMS configuration.

Upon receipt of the requests, external KMS 612 generates a new crypto key and sends an encrypted version and a plain version of the new crypto key to key protection engine 606 at 650. Key protection engine 606 then forwards both versions of the new crypto key to server 604 at 652.

Upon receipt of the plain and encrypted versions of the new crypto key, server 604 sends a request to database 608 at 654 to store the encrypted version of the new crypto key and re-encrypt the information objects stored in the database using the new crypto key. At 656, database 608 responds to server 604 with an acknowledgement indicating that the requested actions have been performed, which server 640 forwards to platform admin console 602 at 658.

Example 9—Example Method for External Key Rotation

Figure 7:
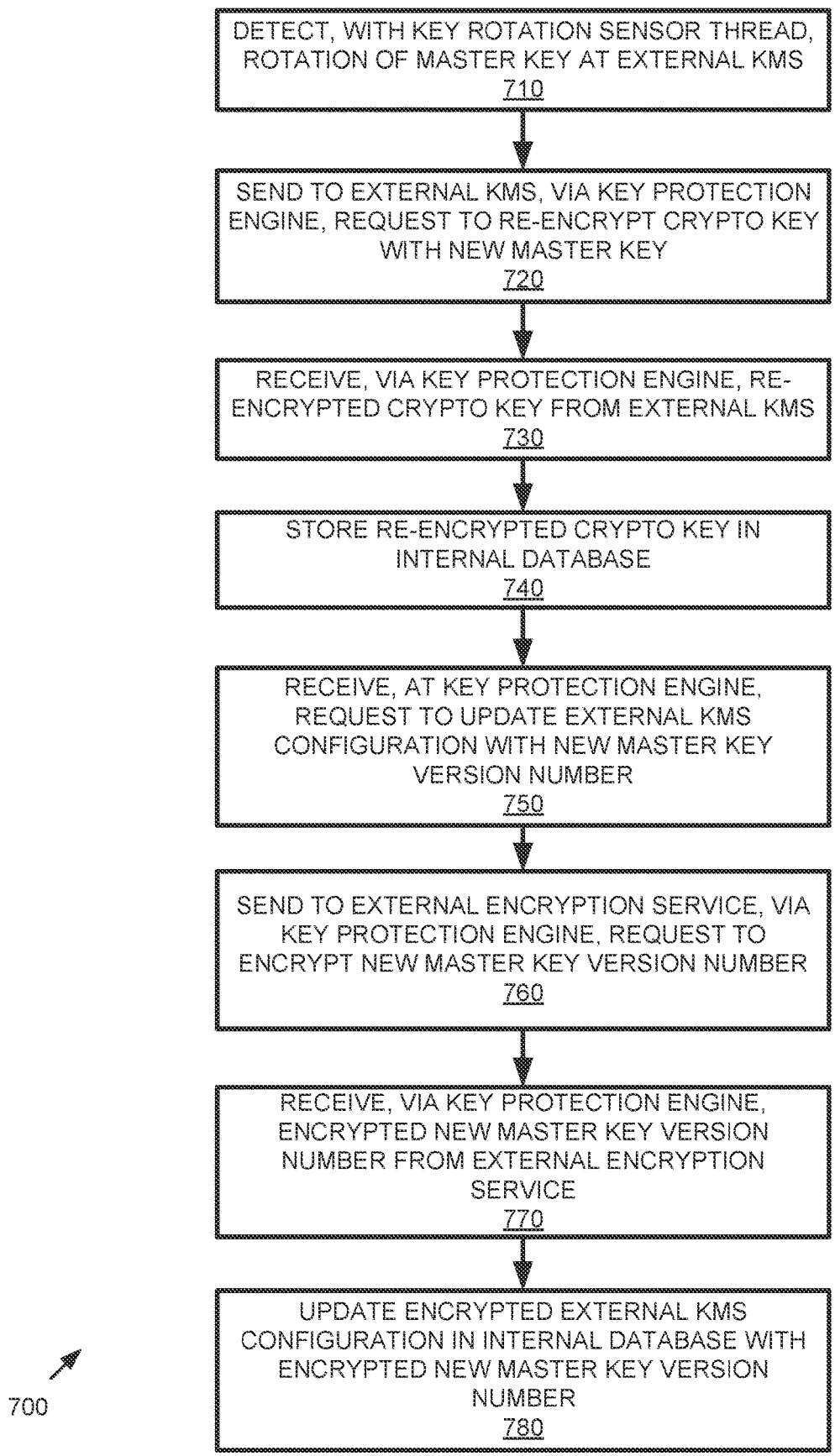
FIG. 7 is a flowchart of an example method for external rotation of a master key stored in an external key management system which is used to encrypt and decrypt a cryptographic key.

FIG. 7 is a flowchart of an example method 700 for external key rotation and can be performed, for example, by the system of FIG. 1. Method 700 can be performed subsequent to method 200 (e.g., following registration/onboarding of the external KMS selected by the customer with the platform). As used herein, external key rotation refers to rotation of the master key. In some examples, a customer admin uses a portal, such as external KMS portal 121 of FIG. 1, to initiate external key rotation (e.g., via input to a UI associated with the portal).

In the example, at 710, a key rotation sensor thread (e.g., key rotation sensor thread 110 of FIG. 1) detects rotation of the master key at the external KMS. For example, the key rotation sensor thread can include a constant pinging mechanism to sense any version changes of the master key that occur within the external KMS. Rotation is detected when the master key version number has changed (e.g., incremented by 1) relative to the current master key version number.

At 720, a request to re-encrypt the crypto key with the new master key (e.g., the new master key generated via the detected external key rotation) is sent from a server of the platform to the external KMS via the key protection engine. In some examples, the key protection engine first establishes a connection with the external KMS (e.g., in the manner described above with reference to FIG. 5), and then sends a request to a REST endpoint of the external KMS to re-encrypt the crypto key, The external KMS then re-encrypts the crypto key using the new master key. At 730, the re-encrypted crypto key is received from the external KMS via the key protection engine.

At 740, the re-encrypted crypto key is stored in the internal database of the platform. Subsequently, the key protection engine receives a request to update the external KMS configuration with the new master key version number (e.g., the new value of the Masterversion parameter).

At 750, the key protection engine receives a request to update the external KMS configuration with the new master key version number. A request is then sent to the external encryption service at 760, via the key protection engine, to encrypt the new master key version number. At 770, the encrypted new master key version number is received from the external encryption service via the key protection engine.

At 780, the encrypted external KMS configuration stored in the internal database is updated with the encrypted new master key version number. For example, the encrypted external KMS configuration stored in the internal database can be modified to replace the prior master key version number with the new master key version number. It will be appreciated that the value of the master key identifier does not change when the master key is rotated; thus, that parameter's value is not updated in the external KMS configuration when the master key is rotated.

Example 10—Example Operations for External Key Rotation

Figure 8:
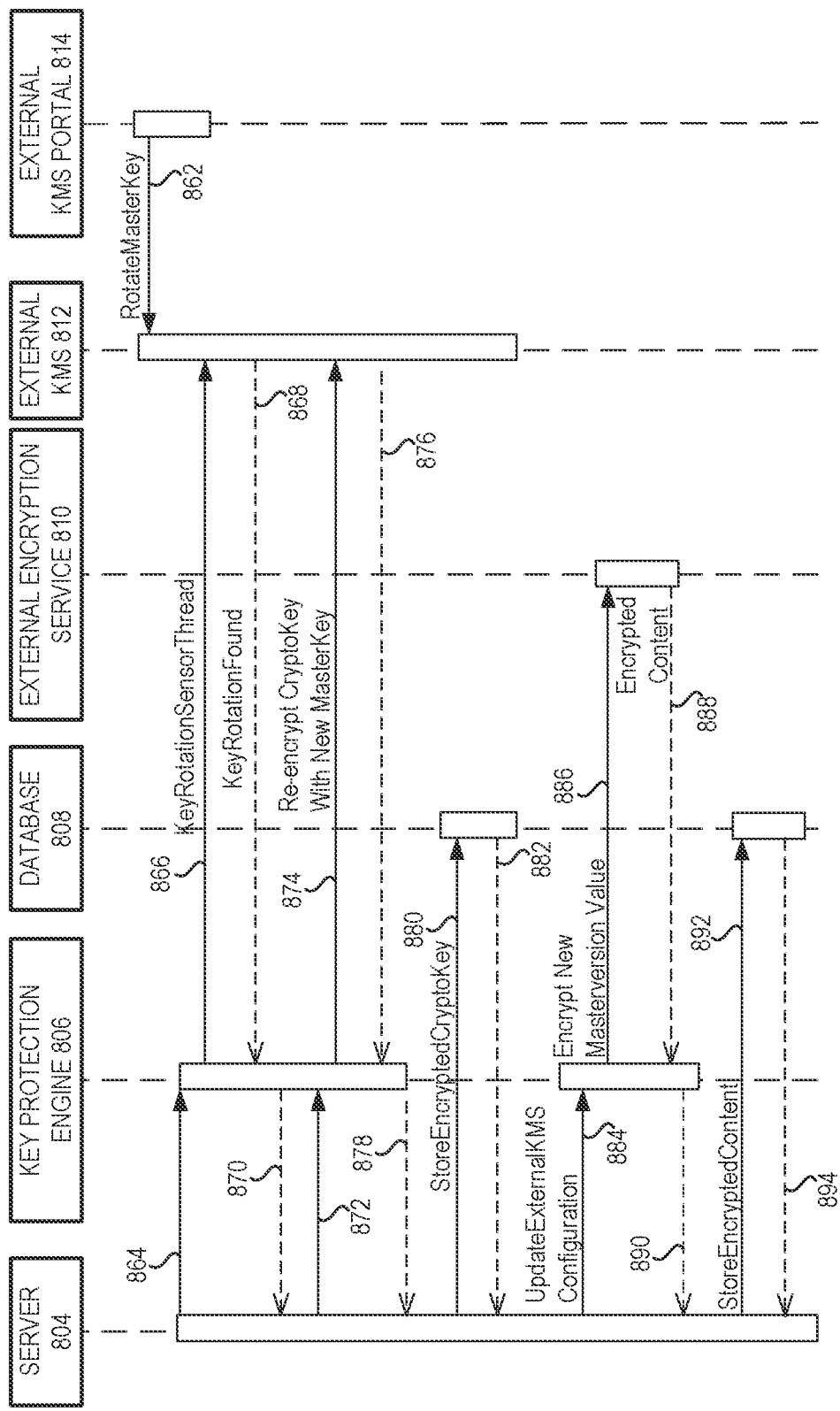
FIG. 8 is a timing diagram showing a process for external rotation of a master key stored in an external key management system which is used to encrypt and decrypt a cryptographic key.

FIG. 8 is a diagram 800 illustrating operations involved in external key rotation (e.g., rotation of the master key). The operations can be carried out by a server 804, a key protection engine 806, a database 808, external encryption service 810, an external KMS 812, and an external KMS portal 814, which components can have functions analogous to those described for the correspondingly named components illustrated in FIGS. 1, 3, and 6.

At 862, a customer admin rotates the master key in the external KMS 812 using the external KMS portal 814. For example, a customer admin can provide input via a UI of external KMS portal 814 which causes the RotateMasterKey request to be sent to the external KMS 812.

At 864, server 804 sends a request to key protection engine 806 to utilize the key rotation sensor thread (e.g., key rotation sensor thread 110 of FIG. 1) to determine whether rotation of the master key has occurred at external KMS 812. Key protection engine 806 then sends a KeyRotationSensorThread request to external KMS 812 at 866, to determine whether master key rotation has occurred (e.g., whether a new master key has been generated to replace the previous master key, causing the version number of the master key ("Masterversion") to increment by 1). Put another way, a pinging mechanism is enacted at 864 and 866 using the key rotation sensor thread to determine whether the version number of the master key has changed.

At 868, external KMS 812 sends a KeyRotationFound message to key protection engine 806, indicating that the master key has been rotated and the version number of the master key has incremented by 1 (e.g., from 0 to 1 or from 1 to 2). The KeyRotationFound message can include the new version number of the master key ("Masterversion"); the KeyRotationFound message does not the master key identifier ("MasterkeyID"), however, which remains the same regardless of whether the master key is rotated.

Key protection engine 806 then forwards the KeyRotationFound message, including the new version number for the master key, to server 804 at 870. At 872, server 804 sends a request to re-encrypt the crypto key with the new master key to key protection engine 806, which in turn forwards the request to external KMS 812 at 874. External KMS 812 then re-encrypts the existing crypto key using the new master key.

At 876, external KMS 812 returns the re-encrypted crypto key to key protection engine 806, which in turn forwards the re-encrypted crypto key to server 804 at 878. At 880, server 804 sends a StoreEncryptedCryptoKey request to database 808, thereby requesting that the database store the re-encrypted crypto key (in particular, the existing crypto key which has been re-encrypted by the external KMS using the new master key). Database 808 sends a response at 882 to server 804 to acknowledge that the requested action has been performed.

Next, at 884, server 804 sends an UpdateExternalKMSConfiguration request to key protection engine 806, along with the new value of the master key version number (i.e., the new value of the Masterversion parameter). At 886, key protection engine 806 sends a request to external encryption service 810 to encrypt the new value of the Masterversion parameter. External encryption service 810 then encrypts the new value of the Masterversion parameter and sends a response to key protection engine 806 at 888 with the encrypted content (in particular, the encrypted value of the new Masterversion parameter). The encrypted value of the new Masterversion parameter is then forwarded from key protection engine 806 to server 804 at 890.

Upon receipt of the encrypted value of the new Masterversion parameter, server 804 responds by sending a "StoreEncryptedContent" command to database 808 at 892, along with the encrypted content (in particular, the encrypted value of the new Masterversion parameter), thereby instructing database 808 to store the encrypted content. The process of storing the encrypted value of the new Masterversion parameter in database 808 can include updating the encrypted external KMS configuration stored in database 808. In particular, database 808 can replace the prior value of the Masterversion parameter in the encrypted external KMS configuration stored in database 808 with the encrypted new value of the Masterversion parameter. Database 808 then sends an acknowledgement to server 804 at 894, indicating that the encrypted external KMS configuration stored in database 808 has been updated with the new Masterversion value.

Example 11—Use Cases

The technologies described herein can be applied in a variety of scenarios.

As one example, the technologies can be integrated into on-premises software associated with platforms (e.g., services) that includes storage of confidential data, among other features. For example, on-premises deployments of software such as the Business Technology Platform (BTP) software and the BOE software (both available from SAP SE of Walldorf, Germany) can incorporate the key protection framework to enhance security while also providing customer flexibility regarding which external KMS and external encryption service is used.

As another example, the technologies described herein can be integrated into platforms implemented as Cloud applications which provide storage of confidential data, such as the RISE with SAP S/4HANA Cloud, Private Cloud Enterprise (PCE) software available from SAP SE of Walldorf, Germany. In some such platforms, as the landscape is maintained by a service provider of the platform as a root user, customers of the platform may appreciate a solution for key protection in which the service provider does not have access to both the encryption key and the encrypted data.

As yet another example, the technologies described herein can be implemented as a microservice. A microservice is a service which can be deployed onto the Cloud. In some examples, the key protection framework can be bundled and transformed into a microservice. The microservice can be tailored to Cloud-based frameworks or platforms. In other examples, the key protection engine and the key rotation sensor thread can each be extended as separate microservices to support integration scenarios for platforms to enhance their security.

Example 12—Example Implementations

Any of the following can be implemented.

Clause 1. A computer-implemented method comprising:
onboarding an external KMS with a platform, the onboarding comprising obtaining a configuration from the external KMS comprising information regarding a master key stored by the external KMS, encrypting the configuration using an external encryption service, and storing the encrypted configuration in an internal database of the platform;
responsive to a request to rotate a cryptographic key used to encrypt data stored by the platform, using information extracted from the configuration to establish a connection between a key protection engine executing on a server of the platform and the external KMS, and initiating rotation of the cryptographic key at the external KMS via the connection; and
responsive to detecting a new version of the master key, transmitting a request to the external KMS to re-encrypt the cryptographic key with the new version of the master key.

Clause 2. The method of Clause 1, wherein the configuration further comprises one or more REST endpoints associated with the external KMS.

Clause 3. The method of Clause 2, wherein establishing the connection with the external KMS comprises, with the key protection engine: fetching the configuration from the internal database; transmitting the configuration to the external encryption service for decryption; using a curl mechanism to send a request to one of the REST endpoints specified in the configuration, the request including the information regarding the master key.

Clause 4. The method of Clause 3, wherein the information regarding the master key comprises an identifier of the master key and a version number of the master key.

Clause 5. The method of any one of Clauses 1-4, wherein the internal database is further configured to store information objects for a customer of the platform.

Clause 6. The method of Clause 5 further comprising, after rotation of the cryptographic key by the external KMS: receiving a plain version of a new cryptographic key and an encrypted version of the new cryptographic key from the external KMS; sending the plain version of the new cryptographic key and the encrypted version of the new cryptographic key to the internal database; and sending a request to the internal database to re-encrypt the information objects stored therein using the new cryptographic key and to store the encrypted version of the new cryptographic key, but not the plain version of the new cryptographic key.

Clause 7. The method of any one of Clauses 1-6, further comprising, after transmitting the request to the external KMS to re-encrypt the cryptographic key with the new version of the master key: receiving a re-encrypted cryptographic key from the external KMS; and transmitting the re-encrypted cryptographic key to the internal database to be stored therein.

Clause 8. The method of any one of Clauses 1-7, further comprising after detecting the new version of the master key: transmitting a version number of the new version of the master key to the external encryption service for encryption; receiving the encrypted version number of the new version of the master key from the external encryption service; and updating the encrypted configuration stored in the internal database with the encrypted version number of the new version of the master key.

Clause 9. The method of any one of Clauses 1-8, wherein the detecting the new version of the master key is performed by a key rotation sensor thread executing on a server of the platform, the key rotation sensor thread being configured to sense changes to a version number of the master key stored by the external KMS.

Clause 10. The method of any one of Clauses 1-9, wherein the external KMS is selected by a customer of the platform from among a plurality of different external KMS types.

Clause 11. The method of any one of Clauses 1-10, wherein the request to rotate the cryptographic key is initiated by the platform at predetermined intervals defined by a service-level agreement between the platform and a customer of the platform.

Clause 12. The method of any one of Clauses 1-11, wherein the platform is configured to be implemented as a microservice to provide key management for a Cloud application.

Clause 13. A computing system comprising: at least one hardware processor; at least one memory coupled to the at least one hardware processor, the at least one memory comprising an internal database configured to store information objects for a customer of a platform; and one or more non-transitory computer-readable media having stored therein computer-executable instructions that, when executed by the computing system, cause the computing system to perform: obtaining a configuration for an external KMS, the configuration comprising information regarding a master key stored at the external KMS; encrypting the configuration at an external encryption service; storing the encrypted configuration in the internal database; responsive to a request to rotate a cryptographic key used to encrypt data stored by the platform, initiating rotation of the cryptographic key at the external KMS; and responsive to detecting a new version of the master key stored by the external KMS, transmitting a request to the external KMS to re-encrypt the cryptographic key with the new version of the master key.

Clause 14. The system of Clause 13, wherein the computer-executable instructions further comprise computer-executable instructions that implement a key protection engine, the key protection engine being configured to facilitate communications between the platform, the external KMS, and the external encryption service.

Clause 15. The system of Clause 14, wherein the configuration further comprises one or more REST endpoints associated with the external KMS.

Clause 16. The system of Clause 15, wherein the computer-executable instructions further comprise computer-executable instructions for establishing a connection between the key protection engine and the external KMS by sending a request to one of the REST endpoints associated with the external KMS using a curl mechanism, the request including the information regarding the master key stored by the external KMS.

Clause 17. The system of any one of Clauses 13-16, wherein the computer-executable instructions further comprise computer-executable instructions for, after detecting the new version of the master key: transmitting a version number of the new version of the master key to the external encryption service for encryption; receiving the encrypted version number of the new version of the master key from the external encryption service; and updating the encrypted configuration stored in the internal database with the encrypted version number of the new version of the master key.

Clause 18. The system of any one of Clauses 13-17, wherein the computer-executable instructions further comprise computer-executable instructions for a key rotation sensor thread, wherein the key rotation sensor thread is a software module configured to sense changes to a version number of the master key stored by the external KMS.

Clause 19. The system of any one of Clauses 13-18, wherein the platform is configured to be implemented as a microservice to provide key management for Cloud applications.

Clause 20. One or more nontransitory computer-readable media comprising computer-executable instructions that, when executed by a computing system, cause the computing system to perform operations for management of keys used to secure data for a customer of a platform; comprising: obtaining a configuration for an external KMS selected by the customer, the configuration comprising information identifying a master key stored at the external KMS; encrypting the configuration at an external encryption service; transmitting the configuration to an external encryption service for storage; storing the encrypted configuration in an internal database of the platform; responsive to a request to rotate a cryptographic key used to encrypt data stored by the platform, initiating rotation of the cryptographic key by the external KMS; executing a key rotation sensor thread configured to detect a new version of the master key; and responsive to detection of the new version of the master key by the key rotation sensor thread, transmitting a request to the external KMS to re-encrypt the cryptographic key with the new version of the master key.

Clause 21. One or more non-transitory computer-readable media comprising computer-executable instructions that, when executed by a computing system, cause the computing system to perform the method of any one of Clauses 1-12.

Example 13—Example Advantages

A number of advantages can be achieved via the technologies described herein. For example, the key protection framework described herein allows a customer to select any existing external KMS to perform key management, and can provide the configuration for the selected external KMS. Allowing customers the flexibility to select which external KMS is used can enhance customer satisfaction and improve the customer's perception regarding the security of data stored by the platform.

Further, because customers are not limited to using the LSS utility for encryption and can instead select any existing encryption service to secure the external KMS configuration, customers advantageously have more control and flexibility with regard to key management and the manner in which their data is secured.

The key protection framework described herein also has the advantage of compatibility with many difference scenarios, including on-premises and Cloud deployments of platforms. Further, in contrast to prior solutions for key protection, the key protection framework described herein can advantageously be extended as a microservice as discussed above.

Example 14—Example Computing Systems

Figure 9:
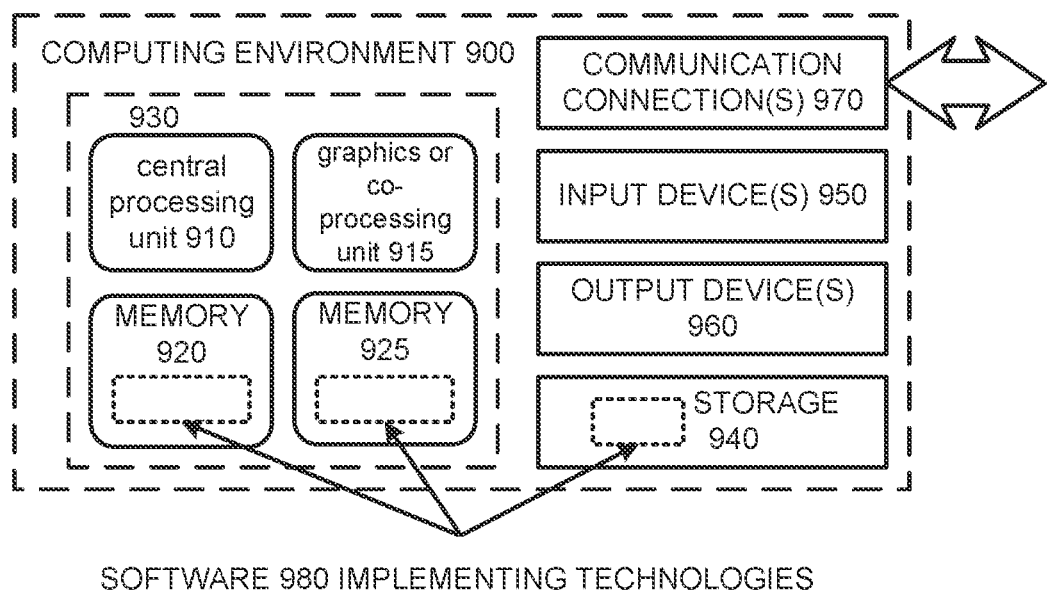
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 can have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 15—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 16—Example Cloud Computing Environment

Figure 10:
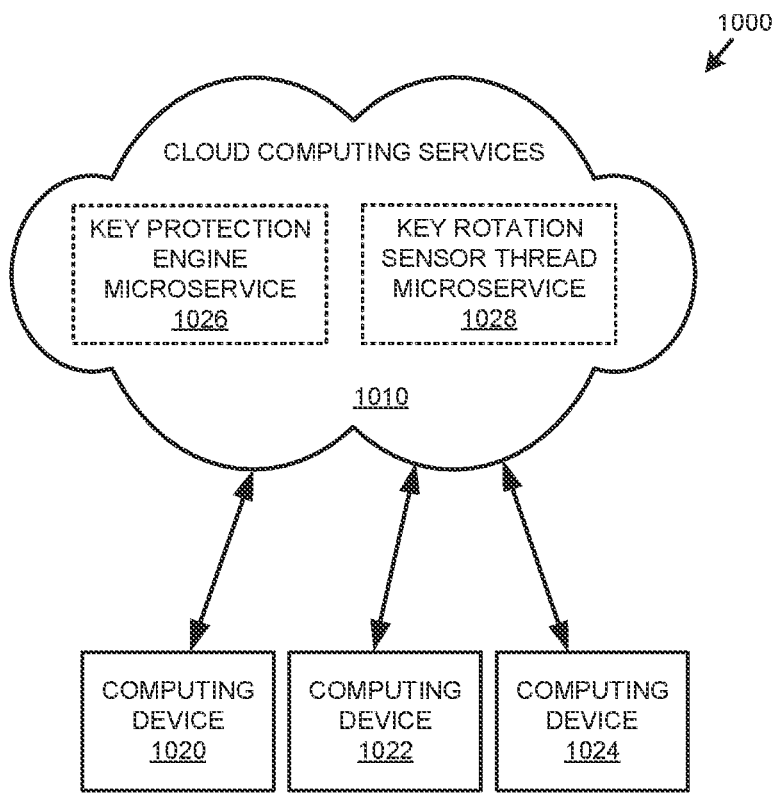
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 of FIG. 1 and other systems herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In the depicted example, cloud computing services 1010 optionally include a key protection engine microservice 1026 and a key sensor thread microservice 1028. Additionally or alternatively, cloud computing services 1010 can include a single microservice which includes the functionality the key protection engine as well as the key rotation sensor thread.

In practice, cloud-based, on-premises-based, or hybrid scenarios can be supported.

Example 17—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 18—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
onboarding an external key management system (KMS) with a platform, the onboarding comprising obtaining a configuration from the external KMS comprising information regarding a master key stored by the external KMS, encrypting the configuration using an external encryption service, and storing the encrypted configuration in an internal database of the platform, wherein the external KMS and the external encryption service are external to the platform;
responsive to a request to rotate a cryptographic key used to encrypt data stored by the platform, using information extracted from the configuration to establish a connection between a key protection engine executing on a server of the platform and the external KMS, and initiating rotation of the cryptographic key at the external KMS via the connection; and
responsive to the platform detecting a new version of the master key, transmitting, by the platform, a request to the external KMS to re-encrypt the cryptographic key with the new version of the master key.

2. The method of claim 1, wherein the configuration further comprises one or more Representational State Transfer (REST) endpoints associated with the external KMS.

3. The method of claim 2, wherein establishing the connection with the external KMS comprises, with the key protection engine:

fetching the configuration from the internal database;
transmitting the configuration to the external encryption service for decryption; and
using a Client URL (curl) mechanism to send a request to one of the REST endpoints specified in the configuration, the request including the information regarding the master key.

4. The method of claim 3, wherein the information regarding the master key comprises an identifier of the master key and a version number of the master key.

5. The method of claim 1, wherein the internal database is further configured to store information objects for a customer of the platform.

6. The method of claim 5 further comprising, after rotation of the cryptographic key by the external KMS:
receiving a plain version of a new cryptographic key and an encrypted version of the new cryptographic key from the external KMS;
sending the plain version of the new cryptographic key and the encrypted version of the new cryptographic key to the internal database; and
sending a request to the internal database to re-encrypt the information objects stored therein using the new cryptographic key and to store the encrypted version of the new cryptographic key, but not the plain version of the new cryptographic key.

7. The method of claim 1 further comprising, after transmitting the request to the external KMS to re-encrypt the cryptographic key with the new version of the master key:
receiving a re-encrypted cryptographic key from the external KMS; and
transmitting the re-encrypted cryptographic key to the internal database to be stored therein.

8. The method of claim 1 further comprising, after detecting the new version of the master key:
transmitting a version number of the new version of the master key to the external encryption service for encryption;
receiving the encrypted version number of the new version of the master key from the external encryption service; and
updating the encrypted configuration stored in the internal database with the encrypted version number of the new version of the master key.

9. The method of claim 1, wherein the detecting the new version of the master key is performed by a key rotation sensor thread executing on the server, the key rotation sensor thread being configured to sense changes to a version number of the master key stored by the external KMS.

10. The method of claim 1, wherein the external KMS is selected by a customer of the platform from among a plurality of different external KMS types.

11. The method of claim 1, wherein the request to rotate the cryptographic key is initiated by the platform at predetermined intervals defined by a service-level agreement between the platform and a customer of the platform.

12. The method of claim 1, wherein the platform is configured to be implemented as a microservice to provide key management for a Cloud application.

13. A computing system comprising:
at least one hardware processor;
at least one memory coupled to the at least one hardware processor, the at least one memory comprising an internal database configured to store information objects for a customer of a platform; and
one or more non-transitory computer-readable media having stored therein computer-executable instructions that, when executed by the computing system, cause the computing system to perform:
obtaining a configuration for an external key management system (KMS), the configuration comprising information regarding a master key stored at the external KMS;
transmitting the configuration to an external encryption service for encryption;
receiving the encrypted configuration from the external encryption service;
storing the encrypted configuration in the internal database;
responsive to a request to rotate a cryptographic key used to encrypt data stored by the platform, using information extracted from the configuration to establish a connection between a key protection engine executing on a server of the platform and the external KMS, and initiating rotation of the cryptographic key at the external KMS via the connection; and
responsive to detecting a new version of the master key stored by the external KMS, transmitting a request to the external KMS to re-encrypt the cryptographic key with the new version of the master key,
wherein the external KMS and the external encryption service are external to the computing system.

14. The system of claim 13, wherein the computer-executable instructions further comprise computer-executable instructions that implement the key protection engine, the key protection engine being configured to facilitate communications between the platform, the external KMS, and the external encryption service.

15. The system of claim 14, wherein the configuration further comprises one or more Representational State Transfer (REST) endpoints associated with the external KMS.

16. The system of claim 15, wherein the computer-executable instructions further comprise computer-executable instructions for establishing the connection between the key protection engine and the external KMS by sending a request to one of the REST endpoints associated with the external KMS using a Client URL (curl) mechanism, the request including the information regarding the master key stored by the external KMS.

17. The system of claim 13, wherein the computer-executable instructions further comprise computer-executable instructions for, after detecting the new version of the master key:
transmitting a version number of the new version of the master key to the external encryption service for encryption;
receiving the encrypted version number of the new version of the master key from the external encryption service; and
updating the encrypted configuration stored in the internal database with the encrypted version number of the new version of the master key.

18. The system of claim 13, wherein the computer-executable instructions further comprise computer-executable instructions for a key rotation sensor thread, wherein the key rotation sensor thread is a software module configured to sense changes to a version number of the master key stored by the external KMS.

19. The system of claim 13, wherein the platform is configured to be implemented as a microservice to provide key management for Cloud applications.

20. One or more nontransitory computer-readable media comprising computer-executable instructions that, when executed by a computing system, cause the computing system to perform operations for management of keys used to secure data for a customer of a platform, comprising:

obtaining a configuration for an external key management system (KMS) selected by the customer, the configuration comprising information identifying a master key stored at the external KMS;

transmitting the configuration to an external encryption service for storage encryption;

receiving the encrypted configuration from the external encryption service;

storing the encrypted configuration in an internal database of the platform;

responsive to a request to rotate a cryptographic key used to encrypt data stored by the platform, using information extracted from the configuration to establish a connection between a key protection engine executing on a server of the platform and the external KMS, and initiating rotation of the cryptographic key at the external KMS via the connection;

executing a key rotation sensor thread configured to detect a new version of the master key; and responsive to detection of the new version of the master key by the key rotation sensor thread, transmitting a request to the external KMS to re-encrypt the cryptographic key with the new version of the master key, wherein the external KMS and the external encryption service are external to the computing system.

\* \* \* \* \*